(12) United States Patent
Fuglevand

(10) Patent No.: US 6,745,799 B1
(45) Date of Patent: Jun. 8, 2004

(54) METHOD FOR DELIVERING A GAS

(75) Inventor: William A. Fuglevand, Spokane, WA (US)

(73) Assignee: Relion, Inc., Spokane, WA (US)

( * ) Notice: Subject to any disclaimer, the term of this patent is extended or adjusted under 35 U.S.C. 154(b) by 0 days.

(21) Appl. No.: 10/321,098

(22) Filed: Dec. 16, 2002

(51) Int. Cl.⁷ .............................................. G01M 3/00
(52) U.S. Cl. ............................. 141/9; 141/100; 48/190
(58) Field of Search ..................... 141/9, 100; 137/3; 48/190

(56) References Cited

U.S. PATENT DOCUMENTS

| | | | | |
|---|---|---|---|---|
| 3,702,619 A | * | 11/1972 | Son ................................ 137/3 |
| 3,771,260 A | * | 11/1973 | Arenson ..................... 48/127.3 |
| 4,773,255 A | * | 9/1988 | Malcosky et al. ........... 73/40.7 |
| 5,632,295 A | * | 5/1997 | Sm.ang.rs ....................... 137/3 |
| 6,142,162 A | * | 11/2000 | Arnold ........................... 137/3 |
| 6,182,717 B1 | | 2/2001 | Yamashita |
| 6,305,442 B1 | | 10/2001 | Ovshinsky et al. |
| 2001/0025670 A1 | | 10/2001 | Ovshinky et al. |
| 2002/0029820 A1 | | 3/2002 | Ovshinky et al. |

* cited by examiner

*Primary Examiner*—J. Casimer Jacyna
(74) *Attorney, Agent, or Firm*—Wells St. John P.S.

(57) ABSTRACT

A method for delivering a gas is disclosed and which includes in its broadest aspect providing a conduit which supplies natural gas to a geographic location; and mixing a gas to be delivered with the natural gas for delivery to the geographic location.

21 Claims, 1 Drawing Sheet

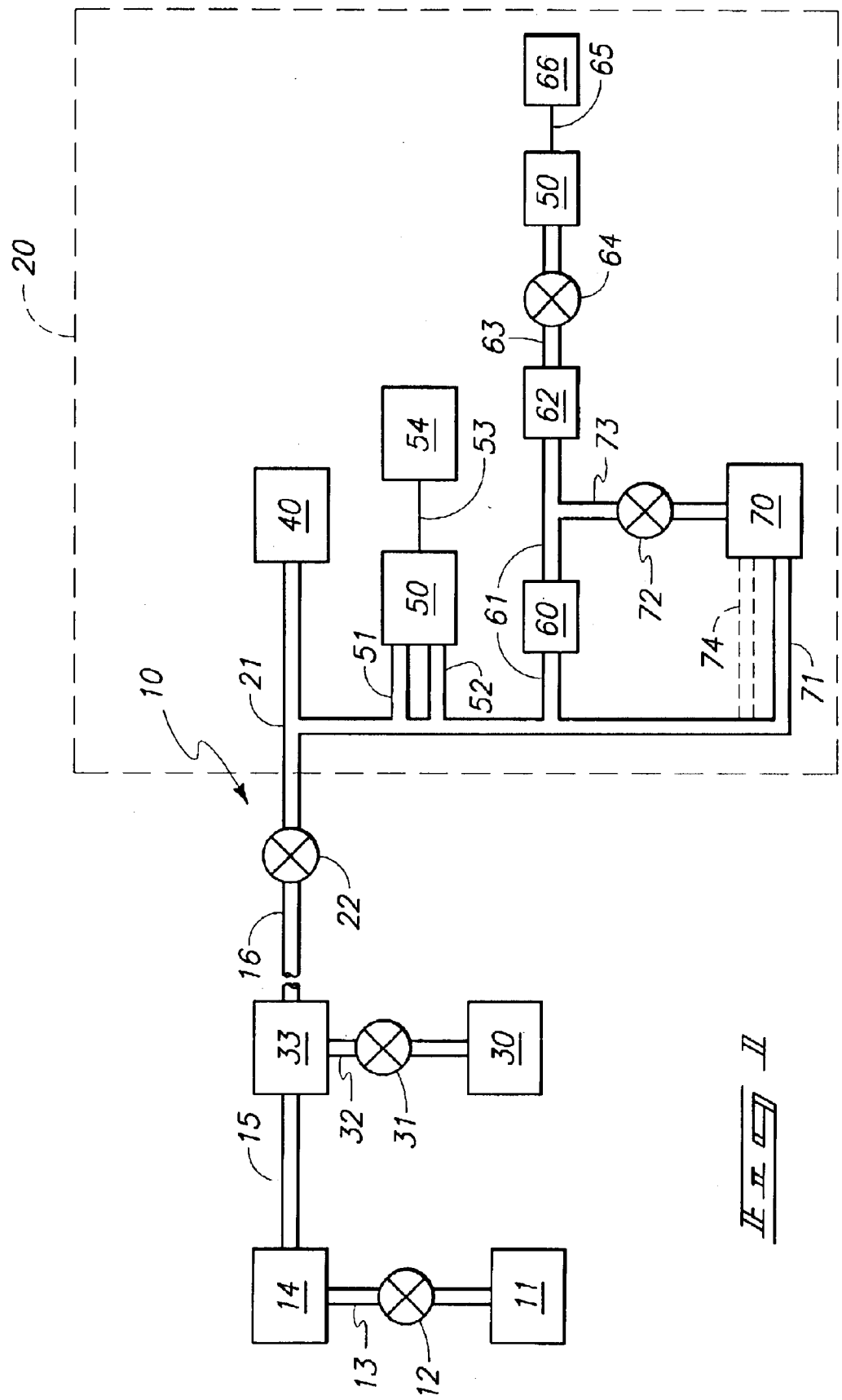

METHOD FOR DELIVERING A GAS

TECHNICAL FIELD

The present invention relates to a method for delivering a gas, and more specifically to a method for delivering a fuel gas such as hydrogen for consumption by a device such as a fuel cell or the like.

BACKGROUND OF THE INVENTION

A fuel cell is an electrochemical device which reacts hydrogen and oxygen, which is usually supplied from ambient air, to produce electricity and water. The basic process is highly efficient in fuel cells fueled directly by hydrogen and are substantially pollution free.

While fuel cells of the nature described have repeatedly shown advantages and promise for the generation of electrical power for various uses, they have not, however, been widely embraced except for narrow industrial applications in view of several perceived difficulties. For example, one of the most cited shortcomings of fuel cells has been the cost per watt of electrical power generated by same.

One of the factors which contribute significantly to the cost of generating each watt of electrical power from a fuel cell is the cost associated with supplying a suitable source of a fuel gas such as hydrogen for use by the fuel cell. In certain industrial applications such as when fuel cells are used as backup power for emergency applications such as in communications facilities, navigation sites and the like, bottled hydrogen is acceptable as a source of fuel because the fuel cell is normally needed for relatively short periods of time. However, in other applications such as where the fuel cell will become the primary source of power for the particular industrial application, bottled hydrogen is usually considered unacceptable as a source of fuel.

Significant research efforts have been undertaken, as of late, to develop chemical reactors which may be integrated with a fuel cell, and which are operable to take a source of hydrocarbon, such as natural gas, and react it in a fashion such that hydrogen is released for use with the fuel cell. While several chemical reactor or fuel processor designs have recently emerged, as a general matter, they are all somewhat complex in design, costly to manufacture, and have not demonstrated the consistent operational reliability necessary for them to be utilized in wide market applications. Still further, the addition of a chemical reactor to current fuel cell designs has the effect of driving the cost per watt to generate electricity even higher.

Other methods and designs have recently emerged to address this hydrogen distribution problem. For example, several schemes are disclosed and which are shown in references such as U.S. Pat. No. 6,305,442; U.S. Publication No. US2001/0025670; US2002/0029820; and U.S. Pat. No. 6,182,717, for example. A common element found in each of these prior art references is the use of a metal hydride which is used to store hydrogen. Thereafter the device which utilizes hydrogen is coupled with this metal hydride device, and is operable to remove the hydrogen from the metal hydride. While these innovative methods and devices will solve some fuel gas distribution problems, they still contribute significantly to the cost per watt to generate electrical power. Therefore, a method which addresses the perceived shortcomings in the prior art methods, devices, and practices is the subject matter of the present invention.

SUMMARY OF THE INVENTION

A first aspect of the present invention relates to a method for delivering a gas and which includes, providing a conduit which supplies natural gas to a geographic location; and mixing a gas to be delivered with natural gas for delivery to the geographic location.

Still another aspect of the present invention relates to a method for delivering a gas to a geographic location and which includes, providing a source of natural gas; providing a conduit coupled in fluid flowing relation relative to the source of natural gas and which delivers a volume of natural gas to the geographic location; providing a source of a gas to be delivered to the geographic location; mixing the source of the gas to be delivered with the natural gas for delivery at the geographic location; providing a first device at the geographic location and which is coupled in fluid flowing relation relative to the conduit and which consumes the natural gas delivered to the geographic location; and providing a second device at the geographic location and which is coupled in fluid flowing relation relative to the conduit, and which consumes the gas which is mixed with the natural gas, and which is delivered to the geographic location.

Yet another aspect of the present invention relates to a method for delivering a gas to a geographic location, and which includes, providing a source of natural gas; providing a natural gas delivery network which is operable to deliver the source of natural gas by way of a conduit to a geographic location; providing a source of a fuel gas to be delivered to the geographic location to the conduit; mixing the source of the fuel gas with the source of natural gas, and wherein the conduit has a volume, and wherein the preponderance of the volume of the conduit comprises natural gas; providing a device at the geographic location and which consumes natural gas during operation, and which is coupled in fluid flowing relation relative to the conduit; and providing an ion exchange membrane fuel cell at the geographic location and which is coupled in fluid flowing relation relative to the conduit and which when supplied with the fuel gas generates electricity.

Still another aspect of the present invention relates to a method of delivering a fuel gas and wherein an accumulator is coupled in fluid flowing relation relative to the conduit, and which stores a volume of the fuel gas delivered by way of the conduit.

Yet a further aspect of the present invention relates to a method of delivering a fuel gas and wherein a chemical reactor which is coupled in fluid flowing relation relative to the conduit, and with the ion exchange membrane fuel cell, and wherein the chemical reactor receives the source of natural gas and chemically converts the source of natural gas into a second source of fuel gas for use by the ion exchange membrane fuel cell.

These and other aspects of the present invention will be discussed in further detail hereinafter.

BRIEF DESCRIPTION OF THE DRAWINGS

Preferred embodiments of the invention are described below with reference to the following accompanying drawing.

FIG. 1 is a simplified schematic view of an arrangement to practice the method of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A method for delivering a gas is generally indicated by the numeral 10 in FIG. 1. As shown therein, the method of the present invention includes providing a source of natural gas 11, and metering the source of natural gas by way of a valve 12 through a conduit 13. The natural gas conduit 13 is coupled with a regional or national natural gas delivery network which is generally indicated by the numeral 14. As seen in FIG. 1, a natural gas main delivery conduit 15 is provided, and which is coupled in fluid flowing relation relative to the natural gas delivery network 14. The conduit 15 is operable to deliver the source of natural gas 11 at its distal end 16 to a geographic location which is generally indicated by the numeral 20. The geographic location may be an industrial plant, small business, or a residential structure. In most cases, the conduit 15 will be a high pressure natural gas main, and the geographic location 20 will be served by a lower pressure service conduit 21 coupled to the high pressure main by way of a natural gas regulator 22. The geographic location 20 will normally consume natural gas by way of various devices which will be discussed in greater detail hereinafter.

As will be seen by reference to FIG. 1 a source of a gas to be delivered with the natural gas 11 for delivery at the geographic location 20 is generally indicated by the numeral 30. The source of gas 30 to be delivered may include a fuel gas such as hydrogen, or the like, and which will be delivered to the geographic location 20 for use by a fuel cell such as a proton exchange membrane fuel cell which will be discussed in further detail hereinafter. The source gas 30 may alternately be a second intermediate gas which is miscible in natural gas and which can be chemically converted at the geographic location 20 into a second fuel gas source. An example of a possible second, miscible gas 30 to be mixed with the source of natural gas 11 is Dimetyl Ether (DME). As a general matter, the second miscible gas must be capable of being readily chemically converted to provide a fuel gas source for the geographic location 20. The source of gas 30 which is to be mixed with the source of natural gas 11 is metered in given amounts by a valve 31 which is coupled in metering relation relative to a conduit 32. The conduit 32 is further coupled in fluid flowing relation relative to the natural gas conduit 15 by way of mixer 33. The source of gas or fuel gas 30 may be any presently available industrial source of hydrogen or second miscible gas currently in use such as for example what might be produced from large scale steam reforming and the like. A smaller scale chemical reformer may also be used for a local or regional natural gas system.

As seen in FIG. 1, a first device 40 is provided at the geographic location 20, and which is coupled in fluid flowing relation relative to the natural gas conduit 15, and more specifically the distal end 16 thereof. It should be understood that the first device 40 may be any device which consumes natural gas during operation. Such devices may include assorted heaters, burners, engines and the like. As will be appreciated, the first device 40 is coupled to the distal end 16 of the natural gas conduit 15 by way of a conduit 21. As will be discussed in greater detail below, the relative amount or concentration of the added fuel and/or other miscible gas provided from the source 30 into conduit 15, relative to the concentration of natural gas, will be of an amount such that substantially all commonly employed natural gas devices 40 will operate normally on the gas mixture supplied by way of conduit 15.

With further reference to FIG. 1, it will be seen that a second device which is generally indicated by the numeral 50, may be provided at the geographic location 20, and which is coupled in fluid flowing relation relative to the conduit 21 and the distal end 16, of the natural gas conduit 15. As should be understood, the second device 50 may include a fuel cell such as an ion exchange or a proton exchange membrane fuel cell which is operable to consume the source of gas 30 which is mixed with the source of natural gas 11 and delivered to the geographic location 20. The proton exchange membrane fuel cell 50 includes an anode, and a cathode (not shown). As will be appreciated by studying FIG. 1, a first conduit 51 is coupled in fluid flowing relation relative to the conduit 21 and the distal end of the natural gas conduit 16. The first conduit 51 delivers the mixture of natural gas 11 and fuel gas 30 to the anode of the fuel cell 50 where the fuel gas (hydrogen) reacts with a catalyst (not shown). Hydrogen ions then migrate across a membrane to react with an oxidant, (such as air) to produce water and a resulting electrical current which may be supplied to other devices at the geographic location 20, or which may be further distributed to other devices more widely located from the geographic location 20.

As seen in FIG. 1, a second conduit 52 is coupled in fluid flowing relation relative to the natural gas conduit 21. The second conduit 52 is also coupled in fluid flowing relation relative to the anode side of the proton exchange membrane fuel cell 50, and is operable to exhaust the natural gas received on the anode side of the proton exchange membrane fuel cell 50 and deliver it back to the natural gas conduit 21. In addition to the foregoing, it will be seen that the second device or the proton exchange membrane fuel cell 50 is electrically coupled by way of an electrical pathway 53 to a first electrical load 54.

As seen in FIG. 1, and in yet another possible arrangement at geographic location 20, a filtering or gas separation device 60 may also be provided. This assembly is coupled in fluid flowing relation relative to the natural gas conduit 21, by way of conduit 61, for the purpose of substantially separating the added fuel gas 30 from the natural gas in conduit 21. In this regard, the filter 60 allows the fuel gas supplied from source 30 to pass therethrough while substantially preventing the natural gas and other miscible gas from moving through conduit 61. Additionally, an accumulator 62 is provided, and which is coupled in fluid flowing relation relative to the filter 60 by way of conduit 61. The accumulator 62 is operable to store a given amount of the fuel gas 30 for use by the second device or proton exchange membrane fuel cell 50. The accumulator 62 is connected in fluid flowing relation relative to the second device by way of conduit 63. Still further, a metering valve assembly 64 is provided along conduit 63 in order to meter the fuel gas 30 which is stored by the accumulator 62 to the second device 50. The fuel cell is electrically coupled by way of electrical pathway 65 to a second load 66.

As seen in FIG. 1, a chemical reactor 70 may be provided at location 20, and which is coupled in fluid flowing relation relative to the distal end 16 of the natural gas conduit 15, by way of conduits 21 and 71. The chemical reactor is operable to take the source of natural gas 11 and/or the second source of miscible gas 30 which is mixed with the source of natural gas 11 and convert it into a second source of fuel gas. Metering valve 72 is provided along a conduit 72, and which selectively meters the resulting second supply of fuel gas to the second device or fuel cell 50. In the event that the chemical reactor only reforms the miscible gas, the natural gas 11 will be returned to the conduit 21 by way of conduit 74 shown in phantom lines.

Operation

The operation of the described embodiment of the present invention is believed to be readily apparent and is briefly summarized at this point.

The present invention 10 is generally shown in FIG. 1 and includes, in its broadest aspect, providing a conduit 15 which supplies natural gas 11 to a geographic location 20, and mixing a gas 30 to be delivered with the natural gas 11 for delivery to the geographic location 20.

As will be seen by studying FIG. 1, a method for delivering a gas 30 to a geographic location 20 includes providing a source of natural gas 11; and providing a conduit 15 coupled in fluid flowing relation relative to the source of natural gas 11 and which delivers a volume of natural gas 11 to the geographic location 20. The method further includes providing a source of a gas 30 to be delivered to the geographic location 20, and mixing the source of gas 30 to be delivered with the natural gas 11 for delivery at the geographic location. Still further, the present method includes providing a first device 40 at the geographic location 20, and which is coupled in fluid flowing relation relative to the conduit 15. The first device 40 consumes the natural gas 11 which is delivered to the geographic location 20. Finally, the present method includes providing a second device 50 at the geographic location 20 and which is coupled in fluid flowing relation relative to the conduit 21 and which consumes the gas 30 which is mixed with the natural gas and which is delivered to the geographic location.

The method of the present invention as illustrated for delivering a gas 30 to a geographic location 20 comprises providing a source of natural gas 11; and providing a natural gas delivery network 14 which is operable to deliver the source of natural gas by way of a conduit 15 to the geographic location 20. The method further includes providing a source of a fuel gas 30 to be delivered to the geographic location 20 by way of the conduit 15. In this regard, the source of the fuel gas is mixed with the source of natural gas. As should be understood, the conduit 15 has a volume. As presently conceived, a preponderance of the volume of the conduit 15 comprises natural gas 11. The mixing of the source of fuel gas 30 to the natural gas 11 is such that the concentration of the added fuel gas 30 relative to the concentration of natural gas 11 will be low enough such that substantially all common natural gas devices 40 will operate normally on the gas mixture supplied by way of conduit 15. The method of the present invention further includes providing a device 50 at the geographic location 20, and which consumes the fuel gas 30 during operation and which is coupled in fluid flowing relation relative to the conduit 21. The device 50 is most often an ion-exchange fuel cell which, when supplied with the fuel gas 30, generates electricity. The added fuel gas 30 is extracted and consumed by device 50 such that substantially only natural gas is delivered back to the conduit 21. Additionally, the method of the present invention includes providing a filtering assembly 60 which is coupled in fluid flowing relation relative to the conduit 15 and which substantially isolates the added fuel gas 30 for delivery by way of conduit 61 to an accumulator 62 which stores a volume of the fuel gas 30. Finally, the method of the present invention includes providing a chemical reactor 70 which is coupled in fluid flowing relation relative to the conduit 15 and with the accumulator 62. The chemical reactor 70 receives the source of natural gas 11 and/or the second miscible gas 30, and chemically converts the source of natural gas or second miscible gas 30 into a second source of fuel gas for eventual use by the ion exchange membrane fuel cell 50. Each of the fuel cells 50 service a load as seen at 54 and 66.

It will be recognized therefore, that the method of the present invention provides a convenient and cost effective means by which a gas to be delivered, such as a fuel gas, can be conveniently delivered to various geographic locations both regionally, and nationally, and which further reduces the cost per watt for generated power which is provided by fuel cells thereby making them a much more attractive electrical energy source for various industry segments.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What I claim is:

1. A method for delivering a gas, comprising:
   providing a conduit which supplies natural gas to a geographic location;
   mixing a gas to be delivered with the natural gas for delivery to the geographic location; and
   providing an ion exchange membrane fuel cell at the geographic location, and wherein the gas which is distributed is a fuel gas which is consumed by the ion exchange membrane fuel cell to produce electricity.

2. A method for delivering a gas, comprising:
   providing a conduit which supplies natural gas to a geographic location;
   mixing a gas to be delivered with the natural gas for delivery to the geographic location; and
   providing a proton exchange membrane fuel cell at the geographic location, and wherein the gas which is distributed is hydrogen and which is consumed by the proton exchange membrane fuel cell to produce electricity.

3. A method for delivering a gas, comprising:
   providing a conduit which supplies natural gas to a geographic location;
   mixing a gas to be delivered with the natural gas for delivery to the geographic location;
   providing a proton exchange membrane fuel cell at the geographic location, and wherein the gas which is distributed is hydrogen and which is consumed as a fuel gas by the proton exchange membrane fuel cell; and
   providing a natural gas filtering assembly at the geographic location and which substantially prohibits the delivery of natural gas to the proton exchange membrane fuel cell at the geographic location.

4. A method as claimed in claim 3, and further comprising:
   providing an accumulator coupled in fluid flowing relation relative to the conduit at the geographic location, and which stores the gas delivered to the geographic location and which is mixed with the natural gas.

5. A method for delivering a gas, comprising:
   providing a conduit which supplies natural gas to a geographic location; and
   mixing a gas to be delivered with the natural gas for delivery to the geographic location; and wherein the conduit delivers a volume of natural gas, and wherein the gas which is mixed with the natural gas is hydrogen, and wherein the volume of the hydrogen is less than 50% of the volume of the natural gas.

6. A method for delivering a gas, comprising:
   providing a conduit which supplies natural gas to a geographic location; mixing a gas to be delivered with the natural gas for delivery to the geographic location;
   providing a fuel cell at a remote geographic location and which, during operation, consumes the gas which is mixed with the natural gas;
   providing a second miscible gas which is mixed with the source of natural gas; and providing a chemical reactor which is coupled in fluid flowing relation relative to the fuel cell and which is operable to convert the second miscible gas into a fuel gas which can be consumed by the fuel cell.

7. A method for delivering a gas to a geographic location, comprising:

providing a source of natural gas;

providing a conduit coupled in fluid flowing relation relative to the source of natural gas, and which delivers a volume of natural gas to the geographic location;

providing a source of a gas to be delivered to the geographic location;

mixing the source of the gas to be delivered with the natural gas for delivery at the geographic location;

providing a first device at the geographic location, and which is coupled in fluid flowing relation relative to the conduit, and which consumes the natural gas delivered to the geographic location; and providing a second device at the geographic location, and which is coupled in fluid flowing relation relative to the conduit and which consumes the gas which is mixed with the natural gas, and which is delivered to the geographic location.

8. A method as claimed in claim 7, and wherein the conduit is coupled in fluid flowing relation relative to a natural gas network which services a wide geographic area.

9. A method as claimed in claim 7, and wherein the source of the gas which is mixed with the natural gas has a volume of less than about 50% of the volume of the natural gas.

10. A method as claimed in claim 7, and further comprising:

providing an accumulator coupled in fluid flowing relation relative to the conduit, and which stores a volume of the gas which is delivered to the geographic location, and which is consumed by the second device.

11. A method as claimed in claim 7, and further comprising:

providing a filtering assembly coupled in fluid flowing relation relative to the conduit, and which substantially prohibits the delivery of the natural gas to the second device.

12. A method as claimed in claim 7, and further comprising:

providing an accumulator coupled in fluid flowing relation relative to the conduit, and which stores a volume of the gas which is delivered to the geographic location, and which is consumed by the second device; and providing a filtering assembly coupled in fluid flowing relation relative to the conduit, and which substantially prohibits the delivery of the natural gas to the accumulator.

13. A method as claimed in claim 7, and wherein the second device comprises an ion exchange membrane, and the gas to be delivered is a fuel gas which is consumed by the ion exchange membrane, and wherein both the fuel gas and the natural gas is delivered to the ion exchange membrane.

14. A method as claimed in claim 7, and wherein the second device comprises an ion exchange membrane, and the gas to be delivered is a fuel gas which is consumed by the ion exchange membrane, and wherein only the fuel gas is delivered to the ion exchange membrane.

15. A method as claimed in claim 3, and wherein the second device is an ion exchange membrane, and the gas to be delivered is a fuel gas which is consumed by the ion exchange membrane, and wherein the method further comprises:

providing an accumulator for storing the fuel gas delivered to the geographic location, and which is mixed with the source of natural gas; and delivering the fuel gas stored by the accumulator to the fuel cell.

16. A method as claimed in claim 7, and wherein the second device is an ion exchange membrane fuel cell, and the gas to be delivered is a fuel gas which is consumed by the ion exchange membrane fuel cell, and wherein the method further comprises:

providing a chemical reactor which is coupled in fluid flowing relation relative to the conduit and which receives the source of natural gas and which chemically converts the source of natural gas into a second source of fuel gas which is supplied to the ion exchange membrane fuel cell.

17. A method for delivering a gas to a geographic location, comprising:

providing a source of natural gas;

providing a natural gas delivery network which is operable to deliver the source of natural gas by way of a conduit to a geographic location;

providing a source of a fuel gas to be delivered to the geographic location to the conduit;

mixing the source of fuel gas with the source of natural gas, and wherein the conduit has a volume, and wherein the preponderance of the volume of the conduit comprises natural gas;

providing a device at the geographic location and which consumes natural gas during operation, and which is coupled in fluid flowing relation relative to the conduit; and providing an ion exchange membrane fuel cell at the geographic location, and which is coupled in fluid flowing relation relative to the conduit, and which, when supplied with the fuel gas generates electricity.

18. A method as claimed in claim 17, and further comprising:

providing an accumulator coupled in fluid flowing relation relative to the conduit, and which stores a volume of the fuel gas delivered by way of the conduit.

19. A method as claimed in claim 17, and further comprising:

an accumulator coupled in fluid flowing relation relative to the conduit, and which stores a volume of the fuel gas delivered by way of the conduit.

20. A method as claimed in claim 17, and further comprising:

providing a chemical reactor which is coupled in fluid flowing relation relative to the conduit, and with the ion exchange membrane fuel cell, and wherein the chemical reactor receives the source of natural gas and chemically converts the source of natural gas into a second source of fuel gas for use by the ion exchange membrane fuel cell.

21. A method as claimed in claim 17, and further comprising:

mixing a source of a second miscible gas with the source of natural gas; and providing a chemical reactor which is coupled in fluid flowing relation relative to the conduit, and with the ion exchange membrane fuel cell, and wherein the chemical reactor receives the source of the second miscible gas and chemically converts the second source of miscible gas into a second source of fuel gas for use by the ion exchange membrane fuel cell.

* * * * *

UNITED STATES PATENT AND TRADEMARK OFFICE
CERTIFICATE OF CORRECTION

PATENT NO. : 6,745,799 B1
DATED : June 8, 2004
INVENTOR(S) : William A. Fuglevand It is certified that error appears in the above-identified patent and that said Letters Patent is hereby corrected as shown below:

Column 7,
Line 60, replace "A method as claimed in claim 3," with -- A method as claimed in claim 7, --.

Signed and Sealed this

Twenty-first Day of December, 2004

JON W. DUDAS
*Director of the United States Patent and Trademark Office*